United States Patent
Kumarasamy Mani et al.

(10) Patent No.: US 9,910,837 B2
(45) Date of Patent: Mar. 6, 2018

(54) CONTROLLING GENERATION OF CHANGE NOTIFICATIONS IN A COLLABORATIVE AUTHORING ENVIRONMENT

(71) Applicant: International Business Machines Corporation, Armonk, NY (US)

(72) Inventors: Senthil Kumar Kumarasamy Mani, New Delhi (IN); Rohan Raju Padhye, New Delhi (IN); Vibha Singhal Sinha, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 585 days.

(21) Appl. No.: 14/469,720

(22) Filed: Aug. 27, 2014

(65) Prior Publication Data

US 2016/0063840 A1    Mar. 3, 2016

(51) Int. Cl.
*G06F 17/22* (2006.01)
*G06Q 10/10* (2012.01)
*H04L 29/08* (2006.01)
*G06F 17/30* (2006.01)

(52) U.S. Cl.
CPC ...... *G06F 17/2288* (2013.01); *G06F 17/3012* (2013.01); *G06Q 10/10* (2013.01); *G06Q 10/103* (2013.01); *H04L 29/08675* (2013.01)

(58) Field of Classification Search
None
See application file for complete search history.

(56) References Cited

U.S. PATENT DOCUMENTS

| | | | | |
|---|---|---|---|---|
| 7,539,747 | B2* | 5/2009 | Lucovsky | G06F 21/335 709/217 |
| 9,256,341 | B2 | 2/2016 | Megiddo et al. | |
| 9,690,785 | B1 | 6/2017 | Vagell | |
| 2003/0187748 | A1* | 10/2003 | Kumhyr | G06Q 10/02 705/7.23 |
| 2004/0267595 | A1* | 12/2004 | Woodings | G06Q 10/06 705/7.14 |
| 2004/0267625 | A1* | 12/2004 | Feng | G06Q 10/10 715/733 |
| 2007/0067764 | A1* | 3/2007 | Byrd | G06F 9/4443 717/168 |

(Continued)

OTHER PUBLICATIONS

Saha et al., A Graph-based Framework for Reasoning about Relationships among Software Modifications, Jun. 2012, pp. 1-5.

(Continued)

*Primary Examiner* — Thomas Dailey
(74) *Attorney, Agent, or Firm* — Ryan, Mason & Lewis, LLP

(57) ABSTRACT

Methods, systems and computer program products are disclosed for controlling generation of change notifications to the one or more users in a collaborative authoring environment.
An automated mechanism is provided to detect the change performed in the artifact. The one or more users who performed changes in the past with the changed artifact are identified. One or more pre-defined parameters, such as contribution, ownership, recency, and longevity, may be used to compute relevancy of the changes made in the changed artifact to determine the qualifying one or more users to be notified. Notifications are generated and delivered to the one or more qualifying other users assessed on the one or more pre-defined parameters.

13 Claims, 7 Drawing Sheets

(56) References Cited

U.S. PATENT DOCUMENTS

2008/0320025 A1* 12/2008 Ozzie .................... G06Q 10/10
2011/0161425 A1    6/2011 Xiao et al.
2013/0041942 A1*  2/2013 Oh ......................... H04L 67/02
                                                                  709/203
2013/0326469 A1   12/2013 Fox et al.
2014/0181053 A1*  6/2014 Belanger .......... G06F 17/30002
                                                                  707/687

OTHER PUBLICATIONS

Kim, An Exploratory Study of Awareness Interests about Software Modifications, ICSE'11, May 2011, pp. 1-4.
Brun et al., Proactive Detection of Collaboration Conflicts, ESEC/FSE'11, Sep. 2011, pp. 1-11.
Guimaraes et al., Improving Early Detection of Software Merge Conflicts, Jun. 2012 pp. 1-11.
Sarma et al., Palantir: Early Detection of Development Conflicts Arising from Parallel Code Changes, Aug. 2012, CSE Journal Articles, Paper 104, pp. 889-907.
Fritz et al., Determining Relevancy: How Software Developers Determine Relevant Information in Feeds, CHI 2011, Session: Web Search & Usability, pp. 1827-1830.
Ripley et al., Using Visualizations to Analyze Workspace Activity and Discern Software Project Evolution, Jan. 2006, ISR Technical Report # UCI-ISR-06-1, pp. 1-17.
Fritz, Developer-Centric Models: Easing Access to Relevant Information in a Software Development Environment, Apr. 2011, pp. 1-163.
Holmes et al., Customized Awareness: Recommending Relevant External Change Events, ICSE'10, May 2010, pp. 1-10.

* cited by examiner

Table 1

| Ownership | | | |
|---|---|---|---|
| Artifact | User | Value | Weight |
| Foo() | ABC | 72% | 8.2 |
| Foo() | XYZ | 28% | 3.8 |
| Bar() | XYZ | 100% | 10 |

Table 1

| Contribution | | | |
|---|---|---|---|
| Artifact | User | Value | Weight |
| Foo() | ABC | 70% | 7.0 |
| Foo() | XYZ | 10% | 1.0 |
| Bar() | XYZ | 50% | 5.0 |

Table 3

| Experience (ABC) | | |
|---|---|---|
| Artifact | Value | Weightage |
| Foo() | High | 8 |
| Bar() | Low | 2 |

Table 4

| Ownership | | | |
|---|---|---|---|
| Artifact | User 1 | User 2 | User 3 |
| File 1 | 50% | 30% | 20% |
| File 2 | 0% | 80% | 2% |
| File 3 | 10% | 70% | 3% |
| File 4 | 80% | 10% | 10% |
| File 5 | 70% | 5% | 5% |
| MAXIMA | 80% | 80% | 20% |

INCOMING CHANGES

Hey there! There are 6 new changes (4 need your attention)...

| Flat View | Source View | Team View |

MOST RELEVANT TO YOU

▲ <u>Alice</u>: *Optimizing cache performance* [9h ago]
    ▪ org.example.project.server.CacheManager
        ▶ refreshCache() | Last changed by you ▲ <u>Bob</u>: *UI improvements* [16h ago]
    ▪ org.example.project.client.MobileClient
        ▶ handleResponse() | 86% owned by you ▲ <u>Tom</u>: *Fixing input validation logic* [19h ago]
    ▪ org.example.project.server.HttpServer
        ▶ doPost() | 80% owned by you
        ▶ isEmail() | 75% of contributions authored by you ▲ <u>Alice</u>: *New supported platforms* [1d ago]
    ▶ /docs/version-1.2/README.txt | 54% owned by you

OTHER CHANGES

▲ <u>Alice</u>: *Fixed NPE in XML parser* [15h ago] (See changes)
▲ <u>Bob</u>: *Update to API documentation* [1d ago] (See changes)

[ Accept All ]   [ Ignore For Now ]

FIG. 4

CONTROLLING GENERATION OF CHANGE NOTIFICATIONS IN A COLLABORATIVE AUTHORING ENVIRONMENT

FIELD OF INVENTION

The invention generally relates to a system, a method and a computer program product for controlling generation of change notifications in a collaborative authoring environment. More particularly the present invention relates to controlling generation of change notifications in the collaborative authoring environment based on determination of relevancy of the users to whom the change notifications may be delivered.

BACKGROUND

Collaborative authoring environment allows multiple collaborators to concurrently work on one or more artifacts during a project development. The collaborators are allowed to edit and make changes to the one or more artifacts, which are checked-in to a central repository. A collaborator may make several changes in one or more artifacts in a checked-in event. Many tools provide a mechanism to notify every other collaborator about the checked-in event in case the other collaborators need to review or understand the one or more changes made to the one or more artifacts. Notifications are generated for the one or more other collaborators corresponding to the checked-in event which includes one or more changes made to one or more artifacts.

SUMMARY

The embodiments herein provide a method, a system and a computer program product for controlling generation of notifications for every change made to one or more artifacts in a collaborative authoring environment. A change performed by a user in an artifact of the collaborative authoring environment is detected. Corresponding to the detected change, one or more other users associated with performing one or more past changes in the changed artifact prior to the detected change are identified. Further, based on one or more pre-defined parameters, the one or more other users qualifying to receive a notification of the detected change are determined. Finally, the notification of the detected change is generated and delivered to the one or more qualifying other users.

BRIEF DESCRIPTION OF THE DRAWINGS

So that the manner in which the above recited aspects are attained and can be understood in detail, a more particular description of embodiments, briefly summarized above, may be had by reference to the appended drawings.

It is noted, however, that the appended drawings illustrate only typical embodiments and are therefore not to be considered limiting of its scope. There may be other equally effective embodiments.

FIG. 3 illustrates an exemplary record of computed values according to one or more embodiments;

FIG. 4 illustrates an example notification according to one embodiment of the invention;

DETAILED DESCRIPTION

Figure 1:
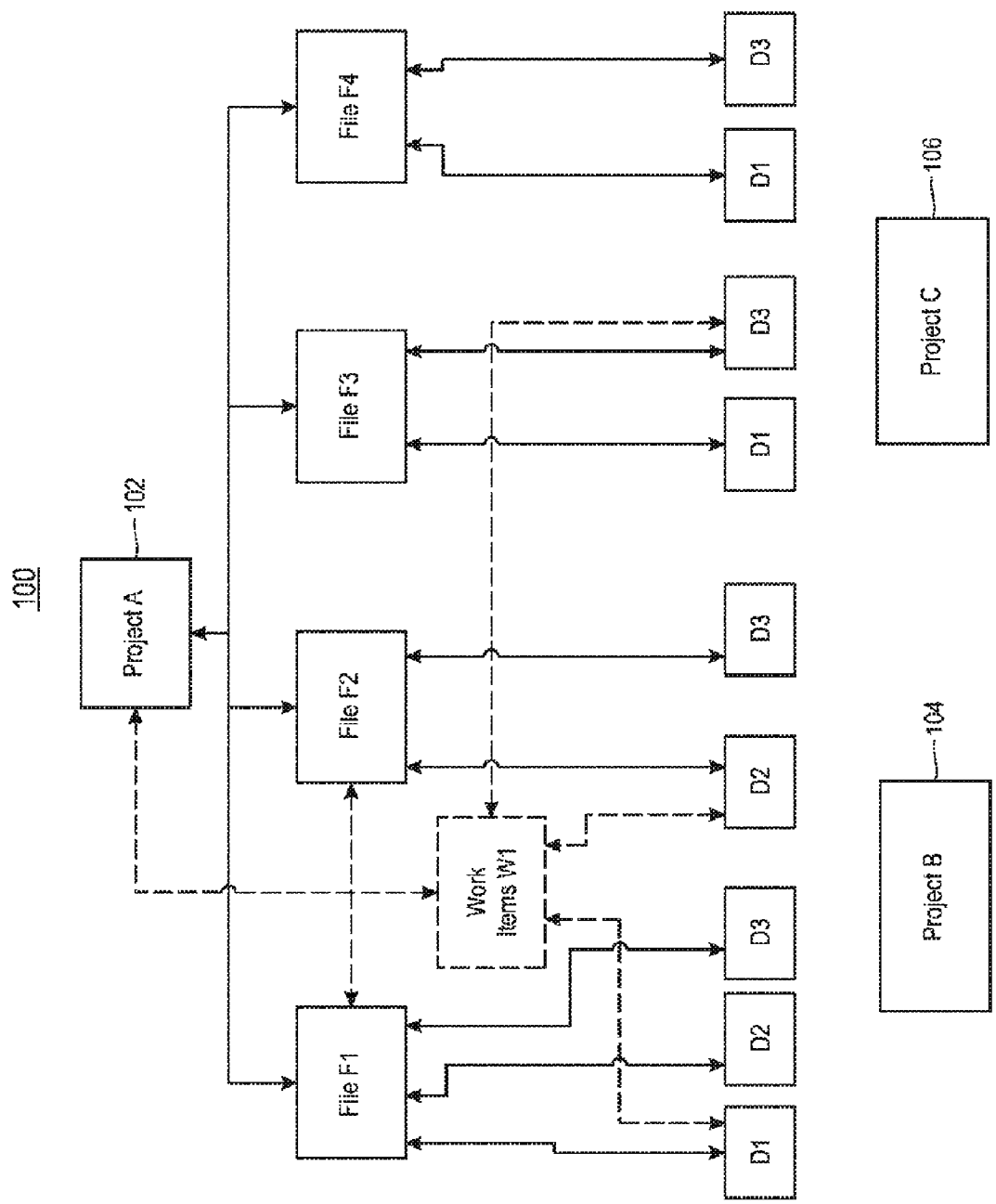
FIG. 1 is a block diagram of an embodiment illustrating a collaborative authoring environment, containing a plurality of projects with one or more artifacts, work items and their association with one or more users.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible approaches, whether or not a particular advantage is achieved by a given embodiment is not limiting of the invention. Thus, the following aspects, features, embodiments and advantages are merely illustrative and are not considered elements or limitations of the appended claims except here explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Definitions

The following terms are defined below to have the following meanings.

In a collaborative authoring environment, the term 'artifact' is defined as a document, or a file or an object which is a part of a project, and which can be modified by a plurality of users. In one example, the artifact may be a code that a user does not wish to write himself/herself and the user can use the artifact which is published ('checked-in') in a repository. In a software development program, the artifact may be a file, class or even a function. In a wild, the artifact may be a document. In a spreadsheet, the artifact may be an individual sheet or a group of cells or a form.

The term 'metadata' is defined to be data that describe the content or context of the project or the artifact with which it is associated. Metadata that are associated with the project can indicate for the project, version of the project, associated artifacts, and other things like revision number of each of the changed artifacts or an identification of a user who created or modified the one or more artifacts in the project.

The term 'project' is used herein to indicate a predefined collection of related artifacts which a group of users maintain. A project can be uniquely identified by a group identifier (ID), optionally with the artifact ID and/or a version number. A project has a unique name and a URL specific to the project. A project tracks its activity including logging as to when an artifact is used and updated, the unique identity of the user that used or updated the artifact. A project can be a parent or subproject of another project, in which case the subproject can inherit the group ID, version number, contributors (users), plugin lists, plugin executions and plugin configuration from the parent.

The term 'versioning system' or 'source control repository' or 'central repository' or 'repository' as used herein is defined to mean an electronic storage system that stores development details of the projects and its artifacts, including relations/associations therebetween (dependencies) for later retrieval. Projects along with their associated artifacts are published in the repository in accordance with the procedures well known in the art. A repository can include a computer server through which the stored copies of project's artifacts are made available for use. Each repository has a unique identifier that indicates its users who contributed to the artifact. A repository can be remote or local. For each change-set or commit delivered to the repository, a new version may be created for the project and similarly a new revision for every changed artifact. For every revision, there may be a BEFORE or AFTER state for every changed artifact. The difference between the BEFORE or AFTER is nothing but the change-set or commit that created this revision (basically, what modifications were made in that version of the changed artifact).

The term 'change-set' or 'commit' is an atomic set of changes, authored or created by one user, which is delivered (or checked-in) to a repository. A change-set or commit includes changes or modifications made to existing multiple artifacts in projects which are created or authored by a user.

The term 'change' as used herein implies a modification to an artifact (for example, adding three lines, deleting four lines, changing a few words in some other line in the artifact, etc.).

The term 'current version' as used herein is the latest version that the users can download (or check-out) from a project and modify in order to create new versions.

The term 'current revision' as used herein is the latest revision (version) of the artifact that the users can download and modify to create new revisions.

The term user or developer or collaborator or creator or author as used herein means a person who checked-in the change-set or commit or a change in a repository.

The term 'machine learning' means a technique that employs one or more algorithms to automatically train and generate a model for some inputs and outputs by analyzing past data. In one example, the model can be trained from past historical data.

The term 'model' as used herein means a rule that takes some values as inputs and produces an output score for some other variable (for example, a model that says if input x>0.3 and input y>0.5 then output Z=0.8).

Overview of Description

Project development is a collaborative activity. Multiple users concurrently work on multiple projects at the same time, checking-in a change-set in a repository and accepting others' changes. Many tools provide a mechanism to notify every team member about a check-in event. Sometimes, the users may have subscribed to receive notifications to keep updates of the changes checked-in by their team members in the project. In general, the users find the number of received notifications as enormous and find it difficult to spend enough time to manually sift through the notifications to identify relevant notifications which match their requirements. Further, the users find content of the received notifications as inadequate in description. Preferably, the users are interested in receiving notifications on the changed artifacts that they are working on or may have worked on in the past. Additionally, the users would like to receive the notifications which may include a rationale as to how the changes made in the artifacts are relevant to them.

Accordingly, the embodiments described below provide a mechanism in a collaborative authoring environment for detecting a change performed by a user in an artifact, identifying one or more other users to whom notifications of one or more detected changes performed by the user in the one or more changed artifacts may be sent. The mechanism includes identifying the one or more other users to whom the one or more changes may be of relevance. In an embodiment, such relevancy is determined based on one or more pre-defined parameters. Examples of such pre-defined parameters are described in detail in the foregoing description.

Discussion will begin with a description of an example project model having multiple layers of abstraction in a collaborative authoring environment. Discussion will then turn to an example system and method for implementing the aforementioned mechanism.

Example Project Model

Discussion of various embodiments of the invention may herein refer to a project model. A project model in the collaborative authoring environment may represent information, process or relation as an example.

Discussion of embodiments begins with a project model, which is a term used herein to refer to any component in the project model, including but not limited to, an entity, attribute, file, and/or parameter, attribute value, tuple, table, column, row, project model itself, including a plurality of such project models.

FIG. 1 is a block diagram illustrating a project model 100 in the collaborative authoring environment having a plurality of projects, according to an embodiment of the present invention. The project model 100 includes project A 102, project B 104, and project C 106. Though no relationship is shown presently in FIG. 1 between the projects A, B, and C (102, 104 and 106, respectively), such projects may be inter-related or interdependent on one another across various levels of abstraction according to different embodiments.

As shown, the project A 102 includes a plurality of artifacts file F1, file F2, file F3, and file F4. The solid directional lines indicate a direct relationship between the artifacts, file F1, file F2, file F3, and file F4 and the project A 102. It is appreciated that other configurations are possible, such as the artifacts file F1, file F2, file F3, and file F4 being correlated and interdependent on one another across various levels of abstraction (not shown). The artifact file F2, may be a sub-artifact in the artifact file F1, or vice versa. Further, if any artifact file F1, file F2, file F3, or file F4 is modified, any other artifact which is inter-related or interdependent on such a modified artifact within the project, may also change accordingly.

Further, there can be other configurations such as the artifacts file F1, file F2, file F3, and file F4 including a sub-portion (not shown) that may correspond across various levels of abstraction. Further, when a sub-portion belonging to any of the artifacts file F1, file F2, file F3, and file F4 is modified, any other sub-portion within the same artifact or any other inter-related or interdependent artifact, may also change accordingly.

Further in FIG. 1, the project 102, includes a work items W1. The work items W1 include one or more pending tasks within the one or more artifacts file F1, file F2, file F3, and file F4 in the project 102. Dashed lines in FIG. 1 indicate a relation between the one or more work items W1 and the artifacts file F1 and file F2 in the project 102. While a one-to-one relationship is shown between the work items W1 and the artifacts file F1 and file F2, it is appreciated that other relations may be present, such as sub-portions within the artifact having a direct relation with such one or more work items W1 listing pending tasks.

The project 102 has users, User D1, User D2, and User D3, having an association with the artifacts F1, F2, F3 & F4 and the work items W1. The past association between the users and the artifacts is depicted by solid lines which indicate one or more changes (activity) performed by the respective user in the one or more artifacts prior to the detected change. The association between the users and work items W1 is depicted by dashed lines indicating pending tasks to be performed by the one or more users in the one or more artifacts.

The relations/associations of the projects, including the artifacts, the work items W1 and the activity of making changes by the one or more users in the one or more artifacts and the work items W1 may be stored within a storage device as a record in a relational database and categorized project wise, artifact wise, sub-portion wise or user wise. The relations data with respect to the aforementioned activities and associations may be stored as a plurality of files and/or tables and/or columns in the storage device.

Figure 2:
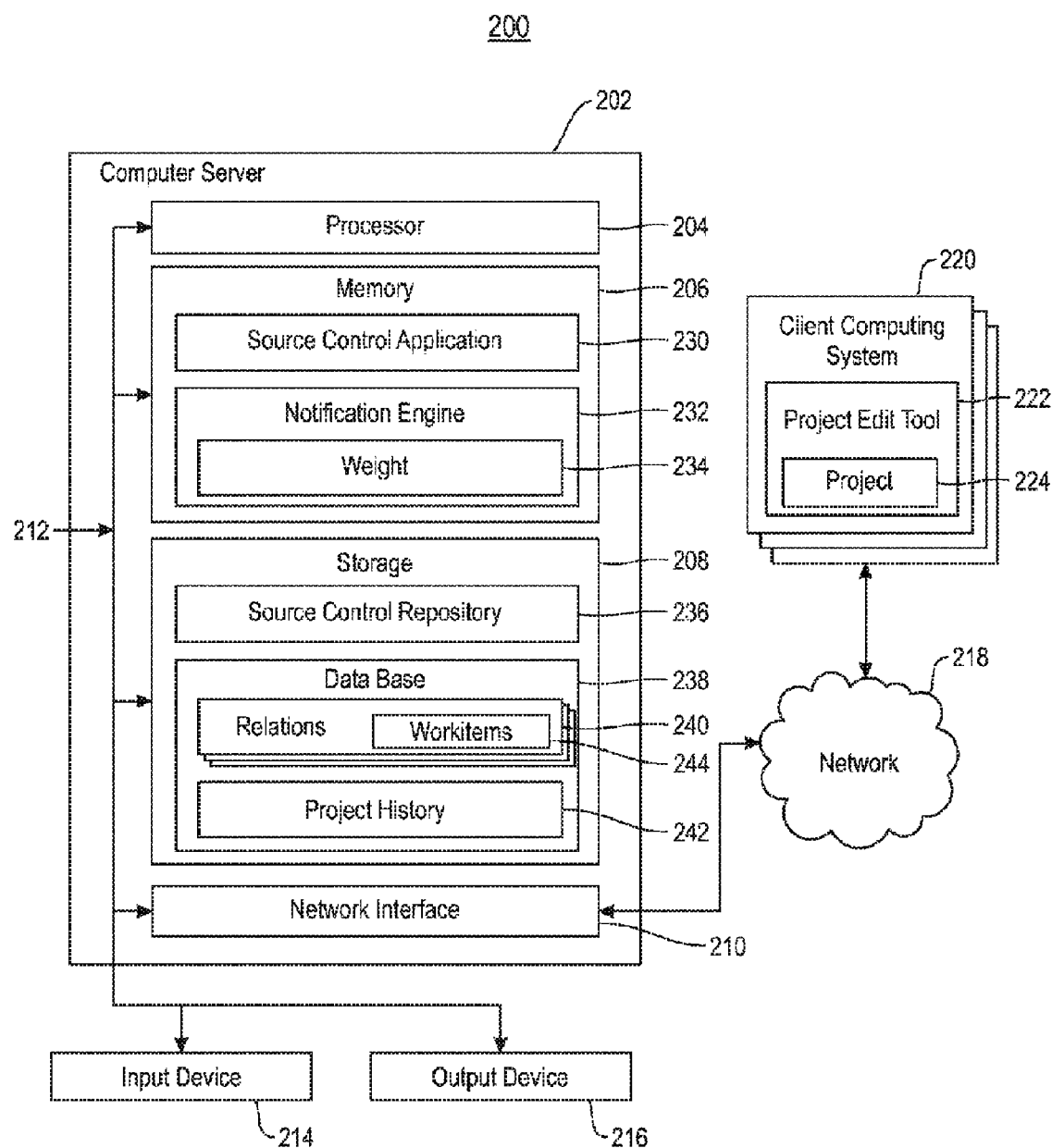
FIG. 2 is a block diagram illustrating a system in which an embodiment of the present invention may be implemented.

FIG. 2 is a block diagram illustrating a system 200 for a project, according to an embodiment. As shown, the system 200 includes a computer server 202 communicatively coupled to one or more client computing systems 220 via a network 218. In general, the network 218 may be a telecommunications network and/or a wide area network (WAN). In an embodiment, the network 218 is the Internet.

The client computing system 220 executing a project edit tool 222 is configured to create and modify a project 224. One example of the project edit tool 222 may be a software application or a suite of software applications that enables a user to develop and modify the project 224. In an embodiment, the project edit tool 222 is configured to display the project 224 in a graphical user interface (GUI) in a display device of the client computing system 220. In one embodiment, the project edit tool 222 may be configured to display the project 224 as an audio or a pop-up alert, or a feed or an e-mail In one implementation, the GUI in the project edit tool 222 may display the project 224 as an extensible markup language (XML) document or any other suitable document format. In one embodiment, the project edit tool 222, may display the project 224 as a customized format. In one embodiment, the project edit tool 222 may be an integrated development environment (IDE), such as a shared environment.

It is contemplated that embodiments may use version control for the entire project. The project edit tool 222 may be configured to communicate with the server 202 to receive the project 224 for local modification and transmit the project 224 after modification for saving thereof.

The project edit tool 222 may be further configured to receive one or more notifications from the server 202. In an embodiment, the project edit tool 222 may be configured to present the one or more notifications of the changes performed in the artifacts by a user of the project, to the one or more other users of the project in real time or preferably after the changes have been finalized, that is, checked-in by the user. In one embodiment, the project edit tool 222 may be configured to present the notifications as a project window, dialog box, alert dialog, audio alert, visual alert, and/or other suitable graphical interface elements such as pop-up alert. In another embodiment, the project edit tool 222, may present the notifications as a personalized information to the one or more users through e-mail, feeds, or alerts. In one embodiment, the project edit tool 222, may present the notification as part of workflow wizard configured to instruct the one or more other users to select one or more actions responsive to the notification, such as approval of pending changes. In one embodiment, the project edit tool 222, may present the notifications indicating a pending task associated with the artifact to be executed by the one or more users recipient of the notifications.

The server 202 generally includes a processor 204 coupled via a bus 212 to a memory 206, a storage 208, an input device 214, and an output device 216. The server 202 is generally under the control of an operating system. Any operating system supporting the functions disclosed herein may be used. The processor 204 is included to be a representative of a single central processing unit (CPU), multiple CPUs, a single CPU having multiple processing cores, and the like. Similarly, the memory 206 may be a random access memory. While the memory 206 is shown as a single entity, it should be understood the memory 206 may comprise a plurality of modules, and the memory 206 may exist at multiple levels, such as high speed registers and caches at lower speed. An interface device 210 may be any type of network communication device allowing the server 202 to communicate with the client computing system 220 via the network 218.

The input device 214 may be any device for providing input to the server 202. For example, a keyboard and/or mouse may be used. The output device 216 may be any device for providing output to a user of the server 202. For example, the output device 216 may be any conventional display screen or set of speakers or a combination thereof. Although shown separately from the input device 214, the output device 216 and the input device 214 may be combined. For example, a display screen with an integrated touch screen may be used.

The memory 206 of the server 202 includes a source control application 230 and a notification engine 232. In one embodiment, the project edit tool 222 may be configured to communicate with the source control application 230 to receive control over the project for making changes/modifications. The source control application 230, by providing control of the project, enables users of the client computing system 220 to modify the one or more artifacts using the project edit tool 222. The source control application 230 may provide a version of the project and/or a revision of the artifact in response to a request from a user of the project edit tool 222 of the client system 220. In one embodiment, the source control application 230 may provide either a full access over the whole project or even a portion of the project or one or more artifacts or a portion of one or more artifacts, and/or work items (pending tasks) to the project edit tool 222 for the user to modify (sometimes referred to as "check out") therein. The source control application 230 may further provide corresponding changes made by the user to the project to the other users to synchronize with a local working copy of the other users (sometimes referred to as "update").

The storage 208 may be a persistent storage device. Although the storage 208 is shown as a single unit, the storage 208 may be a combination of fixed and/or removable storage devices, such as fixed disc drives, solid state drives, floppy disc drives, tape drives, removable memory cards or optical storage. The memory 206 and the storage 208 may be part of one virtual address space spanning multiple primary and secondary storage devices.

The storage 208 of the server 202 includes a source control repository 236 and a database 238. The source control repository 236 may store records of changes/modifications made to the project as a plurality of files or tables and directories or may be implemented as a relational database, such as the database 238.

In one embodiment, the source control application 230 may receive changes/modifications made or performed to the one or more artifacts of the project 224 from the client computing system 220 to save into the source control repository 236, referred as a "commit" or a "change-set". The source control application 230 tracks the project in which the change-set is committed and stores a version of the project along with a revision of each of the one or more changed artifacts in the source control repository 236. The source control repository 236 may store additional information of the change-set along with its metadata, such as the list of artifacts changed, the unique identifier associated with the version of the project and/or the revisions of the one or more changed artifacts, the identity of the user responsible for the change-set, and a timestamp of change-set, etc.

In at least some embodiments, the notification engine 232 within the memory 206 of the server 202 may be configured to communicate with the source control application 230 to monitor the changes made in the change-set received by the source control application 230. For example, upon receiving the change-set, from the user, the source control application 230 may communicate with the notification engine 232 to detect and/or identify the changes made in the one or more artifacts and to further identify the one or more other users to be notified of the pending changes in the project. The notification engine 232 may be a software application executing on the server 202 concurrently with the source control application 230. The source control application 230 and the notification engine 232 may communicate via inter-application messaging techniques. In one embodiment, the notification engine 232 may be configured to receive the change-set committed by a user in the project 224. In one embodiment, the project edit tool 220 may be configured to connect directly to the notification engine 232 of the server 202 to send/deliver/transmit notifications to the one or more other users of the changes made to the one or more artifacts in the change-set in the project.

In one embodiment, once the change-set is received by the notification engine 232, the notification engine 232 identifies and records the corresponding version of the changed project and the corresponding revisions of the one or more artifacts changed in the change-set in the source control repository 236. The notification engine 232 may insert metadata information in each of the changed artifacts corresponding to the aforementioned identification and save them in the source control repository 236 via the source control application 230.

In one embodiment, the notification engine 232 may be configured to record the one or more changes made in the change-set in a database such as project history database 242. The project history database 242 may be a part of the relational database 238. The notification engine 232 may associate the one or more changes in the project history 242 relative to the version system used in the source control repository 236 to facilitate monitoring (detection and identification) the one or more changes in each of the one or more artifacts changed in the change-set. The records of the project history 242 may include both the version number of the project and the revision number of each of the one or more changed artifacts associated with the corresponding version and the revisions of the change-set in the source control repository 236.

The notification engine 232 may be configured to map/identify/detect an association between the users and the one or more changed artifacts and store them in a relations database 240 of the database 238. The notification engine 232 may record the changes made by the user in the one or more changed artifacts including but not limited to, creation, editing and/or subscription in the relations database 240. The notification engine 232 is configured to distinguish the users performing the changes, and accordingly record such changes made by the user as creator or modifier or subscriber, corresponding to each of the one or more artifacts in the relations database 240. For example, when a user creates a new artifact or modifies an existing artifact, the relations database 240 may record the relationship between the user and the changed artifact, either as owner, contributor, modifier, project manager. The relations database 240 may further record other details such as age of the user, any subscription notification, a weightage, etc. The relations database 240 may record separate weightage based on the changes performed by the user in one or more changed artifacts, as creator, modifier or subscriber. The relations database 240 may provide such records to the notification engine 232 to use to notify such user of any subsequent changes made in the one or more changed artifacts.

The database 238 may include a work items database 244, which lists one or more pending tasks in the project to be performed in the future by the users. The work items 244 may be stored in the database 238 as a mapping between the one or more work items, the one or more artifacts and the one or more users likely to perform such pending tasks. The notification engine 232 may be configured to receive one or more work items from the client computing system 220. Further, the notification engine 232 may associate each of the work items 244 with the one or more users in a relations database 240. The notification engine 232 may be further configured to monitor the work items 244 with the project history database 242, based on relations between the one or more users and the one or more artifacts as stored in the relations database 240.

In one embodiment, the notification engine 232 may be also configured to receive a subscription command from the one or more users of the client computing systems 220 requesting to receive or not receive a notification for any changes made to one or more changed artifacts. The notification engine 232 may store the subscription command in the relations database 240.

As described above, once the change-set is received, the notification engine 232 traverses the project history database 242, to track the record of each of the artifacts changed in the change-set and the relations database 240, to track the corresponding relations of the changed artifact and the associated other users with the changed artifact.

The notification engine 232 is configured to identify one or more other users having a past association with the one or more artifacts changed in the change-set. The notification engine 232 tracks the one or more other users and their relations with each of the changed artifacts in the change-set. The notification engine 232 communicates with the project history database 242 and the relations database 240 to determine a relation of the changed artifact and each other user who performed previously in the past in connection with the changed artifact. The determination includes an identification of the project, an identification of the changed artifact, an identification of the other user having a past association with the changed artifacts, date information representing recency of past changes performed by the other user in the changed artifact prior to the detected change, the role of the other user—as the creator or the modifier, notification subscription if any, and a weightage.

The notification engine 232 may be further configured to transmit metadata information with respect to each changed artifact such as an identification of each of the changed artifacts and related past association of the one or more other users with each changed artifacts to a weight module 234. The weight module 234 is configured to determine relevancy of the changed artifacts to each of the one or more other users.

The weight module 234 determines relevancy of the detected changed artifact to each of the one or more other users based on computing a value corresponding to the one or more pre-defined parameters, such as a quantum of past changes prior to the detected change performed by the other user in the detected changed artifact; time elapsed since a last change was performed by the other user in the changed artifact prior to the detected change; time since the other user is a member of the detected changed artifact; a quantum of pending items the other user is scheduled to perform in the detected changed artifact, and a quantum of the portion in the detected changed artifact owned by the other user. Further, the weight module 234 may be configured to compute a value in connection with the other user using other parameters not included herein such as, for example, a value based on historical changes, versions, a user's roles, and subscription. Based on the computed value, the relevancy of the changed artifact to the other user is determined for sending notifications.

The weight module 234 traverses through the transmitted history as provided by the notification engine 232, of each of the changed artifacts to figure out if the changed artifact was modified, prior to the detected change. When the weight module 234 figures out that the changed artifact was modified several times, the weight module 234 computes a value corresponding to the changed artifact for each other user association based on the one or more pre-defined parameters.

In an embodiment, the value corresponding to each other user's association to the changed artifact is computed from a time since a first change was performed by the respective other user in the changed artifact. The value of the other user's association may be computed as the quantum of past changes performed by the other user prior to the detected change in the changed artifact. In an embodiment, the value may be computed as the number of changes made to the changed artifact by the other user over a total number of changes of the changed artifact. In one embodiment, the value may be computed as a percentage of the changed artifact that was written by the other user prior to the detected change. In yet another embodiment, the value may be computed as a percentage of historical modifications to the changed artifact done by the other user relative to each other users. The term quantum of past changes performed by the other user in the changed artifact may be termed as contribution or temporal ownership of the other user. The value for the determination of the relevancy may be computed as a scalar. The range of the value may vary between 0 and 1, wherein 0 implies that the changed artifact was never touched by the other user and 1 implies that all the previous modifications to the changed artifact were done by the other user alone.

Another pre-defined parameter (sometimes referred to as a first pre-defined parameter) on which a value of the other user in the detected changed artifact may be determined for relevancy, is based on computing a quantum of a portion of the changed artifact owned by the other user relative to the other users of the changed artifact. The changed artifact may have multiple owners with a varying fraction of ownership.

The computation of value is domain specific and is based on a content of the changed artifact. In one domain, the value is a fraction of a content of the changed artifact that is created or authored by the other user. In another domain, the value is a percentage of changes made by the other user to the changed artifact. In yet another domain, the value is the number of cells/lines created by the other user in the changed artifact. The computed value may be termed as ownership or spatial ownership of the other user. The value for determining relevancy may be computed as a scalar. Its range may vary between 0 and 1, where 0 implies that none of the content of the changed artifact is owned by the other user, and 1 implies that the entire content of the changed artifact is owned by the other user.

In one embodiment, the weight module may be further configured to compute a value corresponding to a sub-portion within an identified portion of the changed artifact. The value may be computed as a quantum of a sub-portion of the portion of the changed artifact owned by the other user. The value is computed corresponding to the identified one or more owners of the one or more portions (sub-portions within an artifact) of the changed artifact. In other words, for each identified portion of the changed artifact, the value of the other user is a percentage of ownership as a sub-portion in fractions owned by the other user in the portion of the changed artifact. In an example, the value for the other user, as a sub-portion is computed as the fraction of content of the sub-portion of the changed artifact owned by the other user over a fraction of content of the other portion of the changed artifact owned by the one or more other users. This value may provide a finer level of granularity such that the one or more other users who performed changes on their respective sub-portions in the changed artifact are considered for notifications.

At times, there may be interplay between ownership and contribution. For example, in the software program, a minor contributor may overwrite all lines of code of an existing artifact and become a major owner. Conversely, a contributor who made several changes in the past, but each time made a small change in a portion of the artifact, may have a low ownership overall.

Another pre-defined parameter on which a value may be computed for the determination of relevancy of the other user of the changed artifact is based on knowing the exact point in time that the changed artifact was modified by the other user. It is based on the fact that the other user who modified the changed artifact recently is likely to revisit the changed artifact soon and changes made to such artifact may be relevant to such other user. The value may be computed for other users as time elapsed since a last change was performed by the other user in the changed artifact. In one embodiment, value is the latest or the last contribution of the other user to the changed artifact before the current change in the changed artifact. In other words, the value is a minimum distance in time since a change was performed by the other user in the detected changed artifact. The computed value for the determination of relevancy may be termed as recency. The value may be computed in scalar. If the other user has not modified the changed artifact at all in its history, the value may be $\infty$.

Another pre-defined parameter on which a value may be computed for the determination of relevancy to the other user of the changed artifact is based on the fact that the other user who recently modified the changed artifact might have made a minor modification and yet may not be considered qualified as a relevant other user to receive the notification. On the other hand, the other user who may be making several modifications to the changed artifact may be the relevant other user who should qualify to receive notifications. In other words, a value for the other user is computed on knowing the time since the other user has been a member of the changed artifact. In an embodiment, the value is computed as a maximum distance in time since a first change was performed by the other user in the changed artifact. The computed value for the determination of relevancy may be termed as longevity. The value may be computed as a scalar. The range of the value may vary between 0 and 1, wherein 0 implies that the other user has not modified the changed artifact at all in its history, and 1 implies that the other user has evolved with the detected changed artifact since its creation.

Another pre-defined parameter on which a value for the other user in the changed artifact may be computed for determining relevancy is based on determining a quantum of work items such as pending tasks the other user is scheduled to perform in the changed artifact. The relevancy of the computed value may be domain dependent. For example, in a software domain, one pending work item may impact relevancy and in another domain like wild, where lots of users may be tasked to the same work item, the computed value may not be directly relevant.

In one embodiment, the weight module 234 may be further configured to determine an overall experience of the other user in a project, as another pre-defined parameter, to compute a value to determine relevancy. The value of the other user in the project may be computed as a fraction of change-sets committed by the other user in the project. The value is computed as a fraction of change-sets since a first change-set that was committed by the other user in the project until the most recent change-set committed by the other user in the changed artifact. From the computed value, an experience of the other user with that of the author of the current change-set is compared, to decide on relevancy. The computed value may be termed as a contribution of the other user or experience of the other user in the project. In one example, the value may be determined as high, low or medium. In another embodiment, the computed value is a scalar. Its range may vary between 0 and 1.

In one embodiment, the weight module may be further configured to determine relevancy based on a value computed as an age of the other user in a project, as another pre-defined parameter. The age is a time since the other user is performing one or more changes in the one or more artifacts of the project. The value may be computed as a time elapsed since a first change is committed by the other user in the one or more artifacts in the project. In other words, the value is a distance in time since the first change is performed by the other user in the one or more artifacts until a most recent change is performed by the other user in the changed artifact. The computed value is termed as the age of the other user in the project. The value may be computed in scalar. Range of the value may vary from 0-1, wherein, 1 implies that the other user is associated with the project since its inception and 0 means that the other user has no prior association with the project. In other words, the other user has recently joined the project.

The weight module 234 may be configured to compute values corresponding to each of the one or more other users associated with the one or more artifacts changed in the change-set. The weight module computes the values of each other user corresponding to the one or more pre-defined parameters to determine relevancy.

The weight module 234 may be further configured to determine a qualifying score of the other user. The qualifying score of the other user is determined from the computed values corresponding to the one or more aforementioned pre-defined parameters.

In one embodiment, the weight module 234, in order to determine the qualifying score of the other user, may be further configured to assign a weightage corresponding to the computed values of the other user. The weightage is a variable that represents a distinct number as a factor corresponding to the one or more pre-defined parameters. The weight module 234 may assign the weightage to each of the computed values of the other user corresponding to each of the pre-defined parameters. The weight module 234 may use one or more criterion to assign the weightages corresponding to each of the one or more pre-defined parameters. In one embodiment, the weight module 234 may assign one weightage to an owner and another weightage to a contributor/modifier of the changed artifact. In one embodiment, the criterion to assign weightage may be domain specific or domain independent. In one embodiment, the weight module 234 may assign a high weightage to the other user who has subscribed to receiving notifications of the one or more changed artifacts and a low weightage to a user who has requested to 'not' be notified.

In one embodiment, the weight module 234 may assign predetermined weightages to the computed values corresponding to each of the one or more pre-defined parameters as a configuration setting. In another embodiment, the weight module 234 may be configured to compute the weightage corresponding to each of the one or more pre-defined parameters on an on-going basis. The weight module 234 may develop a model which is adaptive to compute the weightages automatically corresponding to the one or more pre-defined parameters. Further, the weight module 234 may use the other user's past activity and any other criterion such as subscription, to create the model on the basis of which the weightages may be generated and assigned. In one embodiment, the weight module 234 may develop the model using statistics or rules or decision trees to compute weightages. In an embodiment, the weight module 234 may be configured to increase or decrease the weightage based on user's activity, for example, when the user checked-in frequently the weightage is increased and when the user has not checked-in since long, the weightage is reduced.

FIG. 3 illustrates the computed values and assigned weightages in one example corresponding to a pre-defined parameter ownership. FIG. 3 shows a Table 1 with four columns corresponding to ownership. Column 1 indicates list of artifacts Foo and Bar changed in the change-set, column 2 indicates users ABC and XYZ, who performed in the past to the changed artifacts, column 3 indicates computed values of ownership for the users ABC and XYZ in the artifacts Foo and Bar, respectively. Column 4 indicates assigned weightages for the users ABC and XYZ, in the artifacts Foo and Bar, respectively. The relevancy of the changed artifacts Foo and Bar may be determined for the users ABC and XYZ, either from the computed ownership values or the assigned weightages.

In FIG. 3, there is illustrated another Table 2 corresponding to the pre-defined parameter contribution. The contents in column 1 and column 2 in Table 2 are the same as those of Table 1. In Table 2, the computed values for users ABC and XYZ, in the changed artifacts, Foo and Bar, are indicated in the third column. The fourth column indicates the assigned weightages for users ABC and XYZ, in the changed artifacts Foo and Bar, respectively. The relevancy may be determined for the users ABC and XYZ in the changed artifacts Foo and Bar, either based on the computed contribution values or the assigned weightages. As illustrated in Table 1 and Table 2 of FIG. 3, the weight module 234 may have employed one criterion for assigning weightages corresponding to the ownership and another criterion for assigning weightages corresponding to the contribution.

Further, FIG. 3 illustrates Table 3, corresponding to the Experience of the user ABC in the change-set. Column 1 indicates changed artifacts Foo and Bar. Column 2 indicates a computed value of the user ABC in the changed artifacts Foo and Bar. Column 3 indicates assigned weightages. The weight module 234 may have the assigned weightage for the user ABC, based on a criterion such as collective past activity of the user ABC in the artifacts Foo and Bar. The relevancy to the user ABC may be determined either from computed values or the assigned weightages in the changed artifacts Foo and Bar.

Referring back to the FIG. 2, the Project edit tool 222 may be configured to receive computed values and assigned weightages (as shown in FIG. 3, Table 1, Table 2, and Table 3) from the notification engine 232 for displaying it to the other users. The Project edit tool 222 may be configured to allow the assigned weightages to be altered or modified by the users. Further, the notification engine 232 may be configured to receive the altered weightages and store them in the relations database 240 for later computation. The weight module 234 is further configured to use the modified weightages of the one or more pre-defined parameters in further computations on ongoing basis.

As described above, the weight module 234 may be configured to compute the qualifying score based on using either the computed values of the other user corresponding to the one or more of the pre-defined parameters or the assigned weightages of the other user corresponding to the one or more of the pre-defined parameters to determine relevancy. In yet one embodiment, the weight module 234 may be configured to compute the qualifying score based on using the computed values and the assigned weightages of the other user corresponding to the one or more of the pre-defined parameters to determine relevancy. In one embodiment, the weight module 234 may consider additional parameters such as subscription apart from the listed pre-defined parameters, to determine the qualifying score for the other users for ascertaining relevancy. The qualifying score is thus determined individually corresponding to the one or more pre-defined parameters.

The weight module 234 may be configured to use an algorithm or any mathematical function to combine the computed values and/or the assigned weightages of the other user conforming to the one or more selected pre-defined parameters to compute the qualifying score. In one embodiment, the mathematical function may be add, subtract, multiply, divide, average or a linear combination of the computed values corresponding to the one or more predefined parameters of the other user. In another embodiment, the mathematical function may be add or subtract or multiply or divide or a sum or average or linear combination, of the assigned weightages corresponding to the one or more predefined parameters. In yet another embodiment, the mathematical function may be add or subtract or multiply or divide or sum or average or linear combination, used to combine the computed values and the assigned weightages corresponding to the one or more predefined parameters to compute the qualifying score of the other user. In an example, the qualifying score of the other user is computed from values and weightages using the linear combination of the mathematical functions of the pre-defined parameters, such as ownership, recency and contribution in the changed artifact (score of the user=(weight of ownership×value ownership+weight of recency×value of recency+weight of contribution×value of contribution+ . . . )).

As described above, once the qualifying score is computed corresponding to the other users' past association in the changed artifacts, conforming to the one or more pre-defined parameters, the notification engine 232 is configured to generate and deliver a notification of the change to the qualifying other users.

In one embodiment, the weight module 234 may be optionally configured to determine a qualifying score of the other user corresponding to the change-set based on a weight value of the other user in the change-set containing the one or more changed artifacts for the determination of relevancy. The weight value of the other user in the change-set is computed corresponding to each of the one or more pre-defined parameters from a maxima. The maxima is a value of the other user which is a maximum computed value among the computed values of the other user, among the one or more changed artifacts corresponding to a pre-defined parameter. The maximum of the other user in the change-set is the maximum computed value computed by aggregating the computed values of the one or more changed artifacts in the change-set corresponding to each of the one or more pre-defined parameters.

One example for computation of a weight value and a maximum of the other user in the change-set corresponding to a predefined parameter ownership is illustrated in Table 4 of FIG. 3. Column 1 of Table 4 indicates artifacts file1, file2, file3, file4, and file5 changed in a change-set committed by a user. Column 2, column 3 and column 4 indicate computed values of the other users, such as user1, user2, and user3, based on their past association in the respective changed artifacts, file1, file2, file3, file4, and file5. The relevancy of the change-set, to the users, user1, user2, and user3, respectively, is computed from the weight value. The computed values of the user 1 is shown as 50%, 0%, 10%, 80%, and 70% in the changed artifacts file1, file2, file3, file4, and file5. The maxima is the maximum computed value among the computed values, 50%, 0%, 10%, 80%, and 70%. As shown the maxima of the user 1 is determined as 80%, which is the maximum value among the one or more changed artifacts. Similarly, the maxima for user 2 and user 3 are determined to be 80% and 20%, respectively. The weight value is computed as the maximum of the other user in the change-set. The weight value is the determined maxima of the user 1, user 2, and user 3, and is 80%, 80% and 20%, respectively, in the change-set. The determined weight value is the qualifying score considered for the determination of relevancy.

Referring back to FIG. 2, the weight module 234 may be further configured to determine a threshold corresponding to the qualifying score of the other user in the one or more changed artifacts, conforming to the one or more predefined parameters. The threshold may be defined as a criterion to identify one or more other relevant users for whom notifications of the changed artifact may be generated. In other words, the threshold represents a level that the other user should have in the changed artifact in order to be considered as a relevant other user, to be notified of the changes made to the changed artifact. In an embodiment, the threshold may be predefined. The predefined threshold may be a part of the configuration setting of the notification engine 232. In one embodiment, the threshold may be dynamically adjusted. The weight module 234 is configured to compute the threshold. In one example, the weight module 234 may be tuned to compute threshold automatically by aggregating the computed values and/or weightages of the one or more other users conforming to the one or more pre-defined parameters. The notification engine 232 may be configured to generate and deliver notifications to the one or more other qualifying users whose qualifying score satisfies the threshold.

Heretofore, the notification engine 232 may be further configured to generate notifications to the one or more other relevant users based on their past association with the one or more changed artifacts in the change-set. The notification engine 232 may be configured to generate and deliver notifications to the one or more other qualifying users evaluated on the one or more pre-defined parameters. The notification engine 232 may be configured to generate notifications to the one or more users based on their qualifying score exceeding the threshold in the one or more pre-defined parameters. In one embodiment, the notifications may be generated and delivered to the one or more other qualifying users based on the computed values and/or the assigned weightages corresponding to the one or more pre-defined parameters. The notification engine 232 may generate and deliver the notifications to the one or more other users with the computed values and/or the assigned weightages in the one or more pre-defined parameters exceeding the threshold. The notifications engine 232 may generate and deliver notifications to the one or more other users corresponding to the one or more pre-defined parameters, with the qualifying score exceeding the threshold. In one embodiment, the notifications engine 232 may generate and deliver notifications to the one or more other users who have subscribed to receive notification to the changes made in one or more changed artifacts. In another embodiment, the notification engine 232 is configured to deliver notifications to the one or more other users with the weight value exceeding the threshold in the change-set.

The notification generally describes the pending change, the changed artifact and the identity of the user who committed the change in the change-set. The notification may explain a rationale as to how an affected change in the one or more changed artifacts in the change-set might be of relevance to the other user. In one embodiment, the notification may include a description of how the one or more changed artifacts may affect the other artifacts in which the notified user has the past association. In one embodiment, the notification may describe the one or more relations 240 between the notified other user and the one or more changed artifacts. In addition to providing a set of the one or more changed artifacts, embodiments advantageously provide a clear explanation to the other user as how the pending change in the one or more artifacts in the change-set is of relevance to the notified other user. The notification may indicate the computed values of the other user corresponding to the one or more pre-defined parameters in the one or more changed artifacts. The notification may optionally provide a list of the one or more changed artifacts in the change-set to the notified other user which may not be directly relevant to the other user. In one embodiment, the notification engine 232 may provide a detailed description of the relevancy of the one or more changed artifacts to the other user, where the computed values and/or assigned weightages of the other user have exceeded the threshold. The detailed description may show relevancy in terms of the past activity of the other user in the one or more changed artifacts in the change-set. The notification engine 232 may optionally provide a list of the one or more artifacts changed in the change-set, to the other user, without the detailed description where the computed values and/or assigned weightages of the other users fail to reach the threshold level. The notification engine 232 may optionally indicate a rationale that the changes in the one or more artifacts do not directly influence the other user and the changes made to such artifacts are not relevant to the other user. The notification may include a text description, a graphical view, and/or a combination thereof explaining the relevance to the other user. An example of sample notification 400 is illustrated in FIG. 4.

Referring back to FIG. 2, the notification engine 232 may transmit notifications to the one or more other users using a variety of transport mechanisms. In one embodiment, the notification engine 232 may connect to the client computing system 220 corresponding to the other user to be notified and transmit the notifications as a real time alert. In one embodiment, the notification engine 232 may be configured to generate the notifications as an e-mail message addressed to an e-mail address associated with the other user to be notified. The e-mail message may be transmitted to the other user using conventional techniques known in the art.

In one embodiment, the notification engine 232 may be configured to receive an acknowledgement from the notified other user confirming receipt of the notification. The notification engine 232 may use the acknowledgement to increase or decrease the weightage between the notified other user and the one or more changed artifacts in the change-set.

In an embodiment using the notification as a real-time alert, the project edit tool 222 may be configured to provide the notification as a dialog box having functional buttons, such as 'Accept', and 'Ignore', which when selected, may provide a feedback indication to the notification engine 232.

Figure 5:
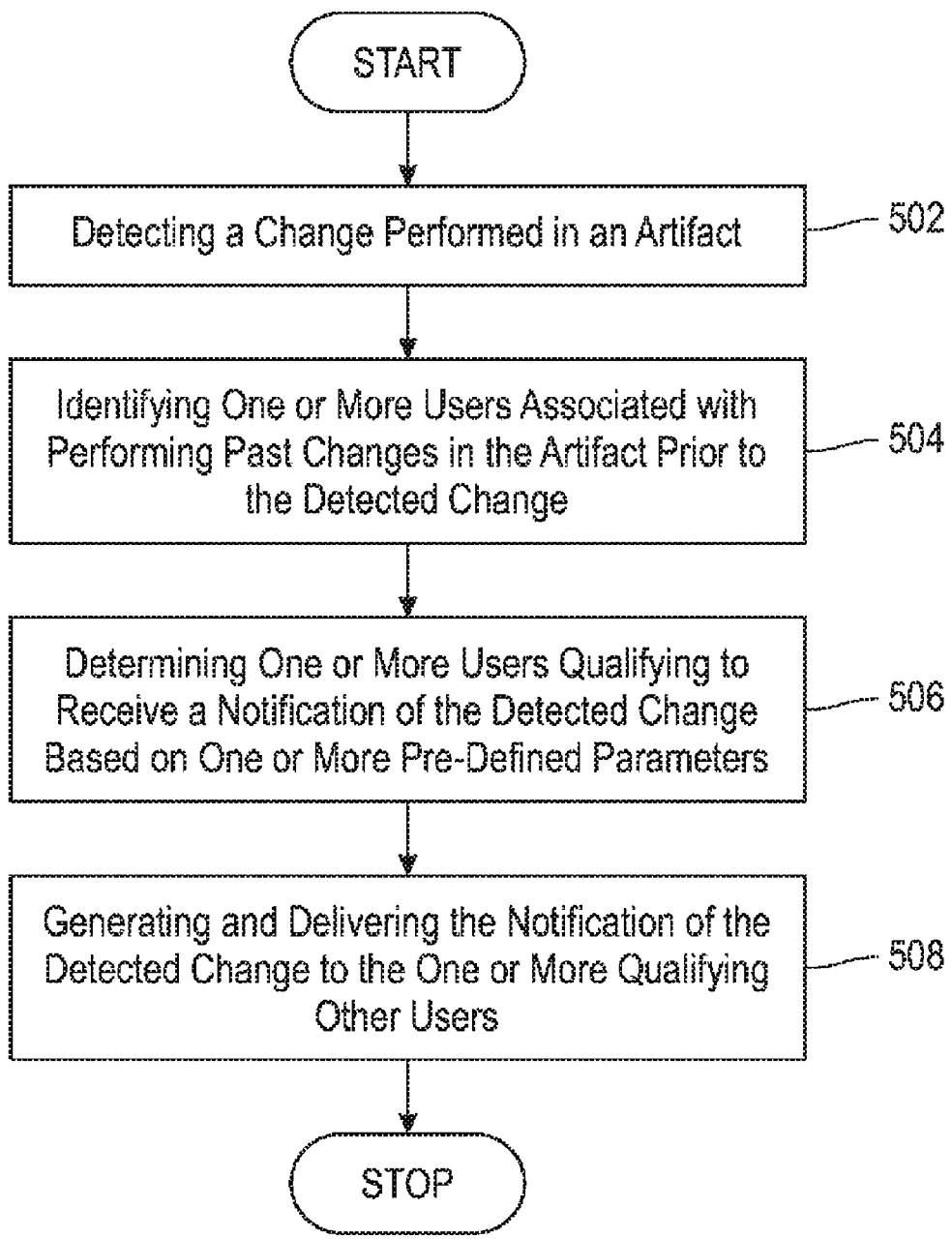
FIG. 5 illustrates a flowchart depicting steps involved in performing an embodiment of the present invention.

FIG. 5 is a flowchart depicting a method 500 depicting steps for determining relevancy of notifications to the one or more other users, according to an embodiment.

At step 502, in a collaborative authoring environment, a change performed by a user in an artifact is detected as depicted in FIG. 2. The artifact in which the current change/modification is made/performed by the user is detected using the metadata associated with the changed artifact. For example, the associated metadata include a unique identifier associated with the version number of the project and/or the revision number of the changed artifact, identity of the user responsible for the change, and a timestamp of the change. In one embodiment, a user is configured to provide a change-set or a commit containing a plurality of changes made in the one or more artifacts. The embodiments of the invention are configured to detect the one or more artifacts changed by the user in the change-set.

At step 504, further to the change detected in the artifact, the relevancy of the changed artifact to the one or more other users is determined for generating notifications. The relevancy is determined based on identifying the one or more other users who have been associated with performing changes in the past to the detected changed artifact. The past performance of the other user is an act of having made one or more changes/modifications to the detected changed artifact prior to the current change. The past association of the other user with the changed artifact is the past performance of the other user to the changed artifact.

A user is required to make at least a change in the artifact to become associated with the artifact. The user who has made the at least a change in the past in the changed artifact is considered as potential candidate to whom notifications may be generated.

At step 506, the one or more other users (potential candidates) of the identified one or more other users (at step 504) to whom changes made in the changed artifact may be relevant for the generation of notifications is determined.

Further to the determination that there was a past association of the other user with the changed artifact, a role which was performed by the other user in the one or more changes made by the other user in the detected changed artifact is determined. The metadata information of the other user may be used to determine the role/action/change performed by the other user, as a creator or a modifier or an editor or a manager or a developer, or a team leader in the changed artifact; and time date information of the change made in the changed artifact.

One or more pre-defined parameters may be used to qualify the one or more identified other users. Few of the pre-defined parameters are listed as: a quantum of the portion in the detected changed artifact owned by the other user; a quantum of past changes prior to the detected change performed by the other user in the detected changed artifact; a time elapsed since a last change was performed by the other user in the changed artifact prior to the detected change and a time since the other user is a member of the detected changed artifact; and a quantum of pending items the other user is scheduled to perform in the detected changed artifact. In one embodiment, a determination whether the other user has subscribed to receiving a notification of the changed artifact may be considered. Using these parameters, the one or more other qualifying users entitled to receive notifications is determined. The qualified one or more other users are the ones to whom changes made in the changed artifact are relevant.

The qualification of the one or more other users is assessed by computing a value. The computed value determines relevancy of the changed artifact to the one or more other users based on the one or more pre-defined parameters.

At step 508, the one or more users who qualify are considered to have relevance to the changes made to the changed artifact. Notifications are generated and delivered to the one or more qualifying users. The notifications may include a description of relevance of the changed artifact to the one or more qualified users.

In one embodiment, the one or more qualified other users corresponding to the one or more artifacts changed in the change-set to be notified on relevancy are determined.

Figure 6:
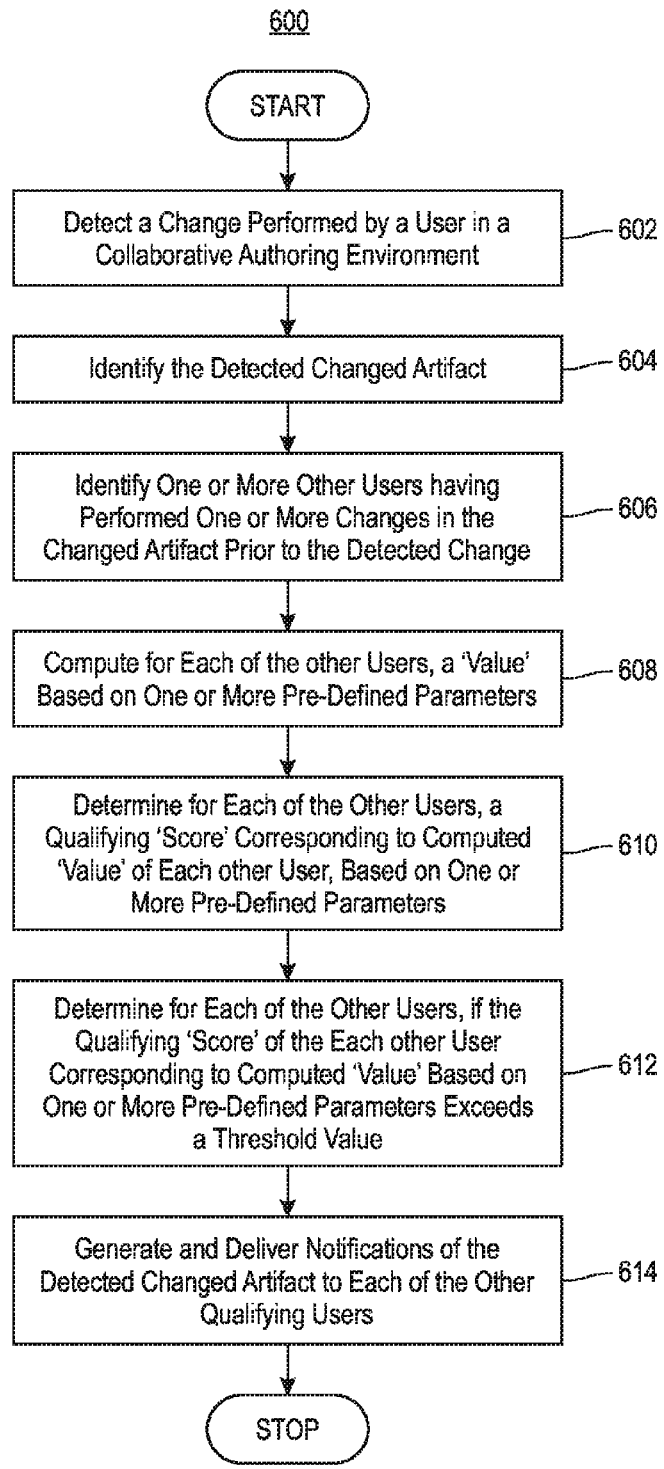
FIG. 6 illustrates a flowchart depicting steps involved in performing another embodiment of the present invention.

FIG. 6 is a flowchart depicting a method 600, according to another embodiment. At step 602, a change performed by a user in an artifact in a collaborative authoring environment is detected.

At step 604, the artifact in which the change is performed may be identified with a revision number of the changed artifact. Changes made in the past into the detected changed artifact are tracked on retrieving a record of the changed artifact.

At step 606, the one or more other users having a past association with the changed artifact are identified. At least one past association of the other user with the changed artifact may be a minimum criterion to determine that the other user is a potential candidate to be considered relevant for receiving the notification of the detected change.

At step 608, for each other identified user, a value is computed to determine relevancy corresponding to the pre-defined parameters, such as ownership, contribution, recency, longevity, etc., in the detected changed artifact. In one embodiment, the relevancy is determined based on the computed value corresponding to each of the one or more pre-defined parameters. In another embodiment, the relevancy is determined based on combining the computed values of the other user in the detected changed artifact conforming to the one or more pre-defined parameters. Any mathematical function may be used to combine the computed values corresponding to the one or more pre-defined parameters. Embodiments of the invention are further configured to select the one or more pre-defined parameters to be combined to compute relevancy.

Optionally, weightages may be assigned to the computed values corresponding to the one or more pre-defined parameters. The weightages may be pre-determined or auto generated. In one embodiment, the weightages to be assigned may be computed based on a model which considers the past activity of each of the other users and/or the roles performed in the past by each of the other users in the changed artifact.

At step 610, a qualifying score of each of the other users is computed based on the computed values corresponding to the one or more pre-defined parameters. In one embodiment, the qualifying score of the other user is computed based on the assigned weightages corresponding to the one or more pre-defined parameters. In another embodiment, the qualifying score is determined based on both the computed values and the assigned weightages of the other user in the changed artifact corresponding to the one or more pre-defined parameters.

At step 612, a determination for each of the other users is made as to whether the computed qualifying score of each other user surpasses a threshold value. The threshold value is an indication of a minimum level of relevancy that each other user must have to receive the notification of the detected changes made in the changed artifact.

If the qualifying score of each other user exceeds the threshold value, then the detected change in the artifact is deemed relevant for each of the other users.

At step 614, the notification of the changed artifact is generated and delivered to each of the qualified other users. The notification may include a detailed description of relevance of the changed artifact to the qualified other user.

One or more embodiments of the invention can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques detailed herein can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 7:
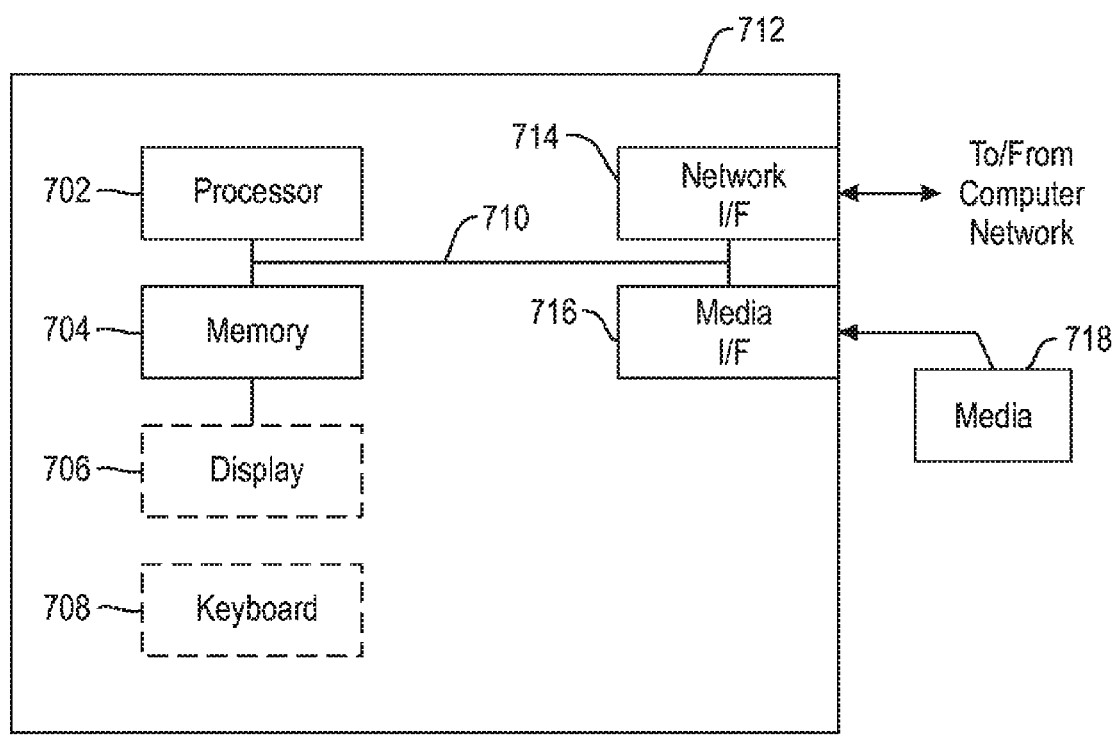
FIG. 7 is a system diagram of an exemplary computer system on which at least one embodiment of the invention can be implemented.

Additionally, an aspect of the present invention can make use of software running on a general purpose computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

One or more embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (for example, servers, storage, networks), enabling convenient, on-demand network access to a shared pool of configurable computing resources that can be rapidly provisioned and released with minimal management effort or service provider interaction. Thus, cloud computing allows a user to access virtual computing resources (for example, storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (for example, an amount of storage space consumed by a user or a number of virtualized systems instantiated by the user). A user can access any of the resources that reside in the cloud at any time, and from anywhere across the Internet. In the context of the present invention, a user may access applications (for example, a DBMS) or related data available in the cloud. For example, the DBMS could execute on a computing system in the cloud and provide access to one or more tables. The one or more tables may be stored at a storage location in the cloud. Doing so allows the one or more tables to be accessed from any computing system attached to a network connected to the cloud (for example, the Internet).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for controlling generation of change notifications, comprising:
   detecting a change performed by a user in an artifact of a collaborative authoring environment;
   identifying one or more other users associated with performing one or more past changes in the artifact prior to the detected change;
   determining, based on pre-defined parameters, the identified one or more other users qualifying to receive a notification of the detected change, wherein the pre-defined parameters comprise:
      a quantum of past changes, prior to the detected change, performed by each of the other users in the artifact;
      time elapsed since the last change performed by each of the other users in the artifact prior to the detected change;
      time since each of the other users has been a member of the artifact; and
      a quantum of pending work items each of the other users is scheduled to perform in the artifact; and
   generating and delivering a notification of the detected change to the qualifying one or more other users.

2. The method of claim 1, further including:
   computing, for each of the other users, a value corresponding to each of the pre-defined parameters and assigning a weightage thereto;
   computing a qualifying score for each of the other users based on a pre-defined mathematical function of the computed values and the corresponding weightages of each of the pre-defined parameters; and
   determining whether each of the other users is a qualifying other user based on the qualification score of each other user satisfying a threshold value.

3. The method of claim 1, further including:
   computing, for each of the other users, a value corresponding to each of the pre-defined parameters;
   computing a qualifying score for each of the other users based on a pre-defined mathematical function of the computed values of each of the pre-defined parameters; and
   determining whether each of the other users is a qualifying other user based on the qualification score of each other user satisfying a threshold value.

4. The method of claim 1 further including:
   identifying one or more owners of the artifact by determining, based on one or more first pre-defined parameters, the one or more owners qualifying to receive a notification of the detected change; and
   generating and delivering the notification of the detected change to the one or more qualifying owners.

5. The method of claim 4, wherein the at least one of the one or more first pre-defined parameters include:
   a quantum of portion owned in the changed artifact by each of the one or more owners; and
   a preference of the one or more owners of the artifact to receive the notification of the detected change.

6. A computer program product for controlling generation of change notifications, comprising:
   a non-transitory computer readable storage medium including a computer usable program code embodied therewith, the computer program product comprising at least one component operable to:
      detect a change performed by a user in an artifact of a collaborative authoring environment;
      identify one or more other users associated with performing one or more past changes in the artifact prior to the detected change;
      determine, based on pre-defined parameters, the identified one or more other users qualifying to receive a notification of the detected change, wherein the pre-defined parameters comprise:
         a quantum of past changes, prior to the detected change, performed by each of the other users in the artifact;
         time elapsed since the last change performed by each of the other users in the artifact prior to the detected change;
         time since each of the other users has been a member of the artifact; and
         a quantum of pending work items each of the other users is scheduled to perform in the artifact; and
      generate and deliver the notification of the detected change to the qualifying one or more other users.

7. The computer program product of claim 6, wherein at least one component of the computer program product is operable to:
   compute, for each of the other users, a value corresponding to each of the pre-defined parameters and assigning a weightage thereto;
   compute a qualifying score for each of the other users based on a pre-defined mathematical function of the computed values and the corresponding weightages of each of the pre-defined parameters; and
   determine whether each of the other users is a qualifying other user based on the qualification score of each other user satisfying a threshold value.

8. The computer program product of claim 6, wherein at least one component of the computer program product is operable to:
   compute, for each of the other users, a value corresponding to each of the pre-defined parameters;
   compute a qualifying score for each of the other users based on a pre-defined mathematical function of the computed values of each of the pre-defined parameters; and
   determine whether each of the other users is a qualifying other user based on the qualification score of each other user satisfying a threshold value.

9. The computer program product of claim 6, wherein at least one component of the computer program product is operable to:
   identify one or more owners of the artifact by determining, based on one or more first pre-defined parameters, the one or more owners qualifying to receive a notification of the detected change; and
   generate and deliver the notification of the detected change to the one or more qualifying owners.

10. The computer program product of claim 9, wherein at least one component of the computer program product is operable to determine the one or more qualifying owners using at least one of the following one or more first pre-defined parameters:
  a quantum of portion owned in the changed artifact by each of the one or more owners; and
  a preference of the one or more owners of the artifact to receive the notification of the detected change.

11. A system comprising:
  a memory; and
  at least one processor operably coupled to the memory and configured to:
  detect a change performed by a user in an artifact of a collaborative authoring environment;
  identify one or more other users associated with performing one or more past changes in the artifact prior to the detected change;
  determine, based on pre-defined parameters, the identified one or more other users qualifying to receive a notification of the detected change, wherein the pre-defined parameters comprise:
    a quantum of past changes, prior to the detected change, performed by each of the other users in the artifact;
    time elapsed since the last change performed by each of the other users in the artifact prior to the detected change;
    time since each of the other users has been a member of the artifact; and
    a quantum of pending work items each of the other users is scheduled to perform in the artifact; and
  generate the notification of the detected change to the one or more qualifying other users.

12. The system of claim 11, wherein the at least one processor is further configured to:
  compute, for each of the other users, a value corresponding to each of the pre-defined parameters;
  compute a qualifying score for each of the other users based on a pre-defined mathematical function of the computed values of each of the pre-defined parameters; and
  determine whether each of the other users is a qualifying other user based on the qualification score of each other user satisfying a threshold value.

13. The system of claim 11, wherein the at least one processor is further configured to:
  compute, for each of the other users, a value corresponding to each of the pre-defined parameters and assigning a weightage thereto;
  compute a qualifying score for each of the other users based on a pre-defined mathematical function of the computed values and the corresponding weightages of each of the pre-defined parameters; and
  determine whether each of the other users is a qualifying other user based on the qualification score of each other user satisfying a threshold value.

* * * * *